United States Patent
Dal Lago et al.

(10) Patent No.: US 12,510,877 B2
(45) Date of Patent: Dec. 30, 2025

(54) GRAPHICAL PROGRAMMING INTERFACE FOR PROGRAMMING A SAMPLE INSPECTION PROCESS, AND RELATED PROGRAMMING METHOD

(71) Applicant: STEVANATO GROUP S.P.A., Piombino Dese (IT)

(72) Inventors: Nicola Dal Lago, Thiene (IT); Matteo Lazzarin, Zelarino (IT); Luca Vallati, Mira (IT)

(73) Assignee: STEVANATO GROUP S.P.A., Piombino Dese (IT)

( * ) Notice: Subject to any disclaimer, the term of this patent is extended or adjusted under 35 U.S.C. 154(b) by 413 days.

(21) Appl. No.: 18/163,507

(22) Filed: Feb. 2, 2023

(65) Prior Publication Data
US 2023/0297067 A1 Sep. 21, 2023

(30) Foreign Application Priority Data
Mar. 16, 2022 (IT) .......................... 102022000005147

(51) Int. Cl.
G05B 19/4069 (2006.01)
(52) U.S. Cl.
CPC .................. *G05B 19/4069* (2013.01); *G05B 2219/37439* (2013.01); *G05B 2219/45047* (2013.01)
(58) Field of Classification Search
None
See application file for complete search history.

(56) References Cited

U.S. PATENT DOCUMENTS

| | | | | |
|---|---|---|---|---|
| 2003/0038841 A1* | 2/2003 | Vazquez | ............ | G05B 19/0426 715/762 |
| 2010/0226561 A1* | 9/2010 | Fujikawa | .............. | G06T 7/0004 382/141 |
| 2013/0108147 A1 | 5/2013 | Harada et al. | | |
| 2015/0220809 A1 | 8/2015 | Kawabata et al. | | |
| 2015/0221077 A1 | 8/2015 | Kawabata et al. | | |

OTHER PUBLICATIONS

Italian Search Report issued Oct. 4, 2022 in Italian Application No. 102022000005147 filed on Mar. 16, 2022 8 pages (with English Translation of Categories of Cited Documents & Written Opinion).

* cited by examiner

*Primary Examiner* — Sean Shechtman
(74) *Attorney, Agent, or Firm* — Oblon, McClelland, Maier & Neustadt, L.L.P.

(57) ABSTRACT

A graphical programming interface for programming an inspection process of samples. The inspection process is a recognition process, based on images, of defects of samples. A graphical programming interface includes at least one image input type block including an input into a memory of a multiplicity of images of at least one sample, a multiplicity of operation type blocks. Each operation type block includes at least one operation which processes images, a multiplicity of sorting type blocks. The graphical programming interface allows at least one image input type block to be selected if more than one input type block is provided for, at least one operation type block among the multiplicity of operation type blocks, and at least one sorting type block among the multiplicity of sorting type blocks.

18 Claims, 1 Drawing Sheet

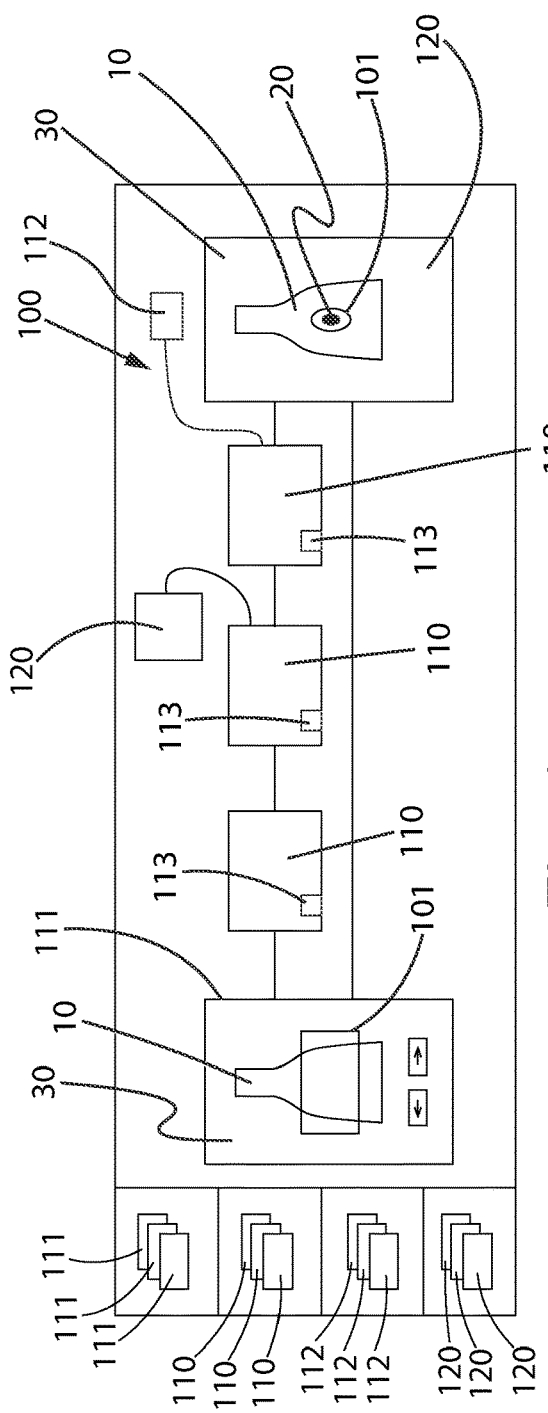
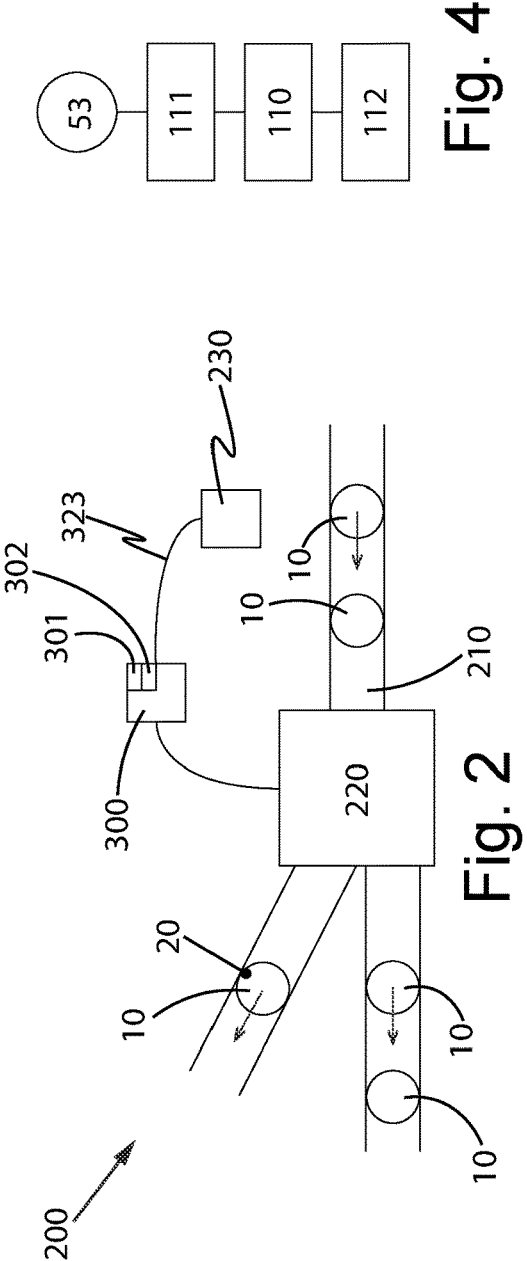

GRAPHICAL PROGRAMMING INTERFACE FOR PROGRAMMING A SAMPLE INSPECTION PROCESS, AND RELATED PROGRAMMING METHOD

The present invention refers to a graphical user interface or graphical programming interface for programming a sample inspection process, and a related programming method.

In the pharmaceutical industry, the integrity of the primary packaging is of vital importance, in order to deliver to the patient medicinal drugs of flawless quality. Primary packaging is defined as a container which is in direct contact with the pharmaceutical product contained therein. In order to be used, a primary container must therefore meet very specific and stringent quality standards, to avoid the contamination of its contents. Inspection systems are known, which are provided with apparatuses for acquiring images and software for analyzing such images. These inspection systems comprise one or more inspection stations provided with cameras and illuminators, which acquire images of static or moving samples. As quality standards grow, the analysis carried out by such systems has reached considerable levels of complexity, so that it is necessary to develop very complex routines for image analysis and classification. The result is that for each individual type of container and/or medicinal drug, and/or for each individual pharmaceutical company, it is necessary to develop one or more different inspection algorithms. The need to offer the final user the possibility of configuring the inspection algorithm in an intuitive manner and without the need of special programming capability is felt. Furthermore, in the industrial field it is necessary for the image analysis times not to exceed the rapid advancing times of the sample along the manufacturing lines. Therefore, a close coordination between hardware and image analysis and data processing software is necessary. Several types of graphical interfaces for configuring visual inspection programs based on image processing are known. Most of them offers the user the possibility of configuring, through interactive menus, an even very high and diversified number of image manipulation operations, each one with the possibility of accessing to several configuration parameters of each operation. Existing graphical programming interfaces of an inspection algorithm are based on graphical elements of an icon type, representative of image processing operations, so as to allow inspection algorithms to be built without requiring the user to have specific programming capabilities, preventing the generation of syntax errors.

In order to evaluate the correctness and efficiency of the program, such known graphical programming interfaces require it to be programmed from beginning to end, after, if necessary, being subject to compilation, every time a change is made.

The object of the present invention consists in creating a graphical programming interface which allows both programming and simulating a sample inspection process in order to optimize such process in terms of quantity of involved parameters and/or of number of involved image processing operations and/or in terms of time reduction; a secondary object is to create such an interface which allows the effectiveness of the simulated process to be analyzed during the programming operations, allowing to interactively intervene at any point of a flow of operations forming the process.

According to the invention, such object is achieved with a graphical programming interface according to claim 1.

In a first aspect, the invention relates to a graphical programming interface for programming a sample inspection process, wherein said graphical programming interface is implemented on a computer comprising at least one processor and at least one memory.

Said inspection process may be suitable for and in particular configured to control an inspection machine. The inspection machine may be connected to the computer or connected to a second computer on which the inspection process programmed with the graphical programming interface is executed.

Said inspection process is an image recognition process of sample defects.

Said inspection process may comprise at least one operation which processes images depicting samples. The images may be processed one at a time or more than one at a time.

The graphical programming interface may comprise at least one image input type block, which may comprise an input into said at least one memory of a multiplicity of images of at least one sample.

The graphical programming interface may comprise a multiplicity of operation type blocks.

Each operation type block may comprise at least one operation which processes images.

The graphical programming interface may comprise at least one sorting type block and preferably a multiplicity of sorting type blocks.

The graphical programming interface may allow to select at least one image input type block, if more than one input type block is provided, at least one operation type block among said multiplicity of operation type blocks, and at least one sorting type block among said multiplicity of sorting type blocks.

The graphical programming interface may simulate the inspection process under programming, thereby implementing a simulated inspection process.

Said simulated inspection process may comprise an execution on the computer of said at least one preselected image input type block.

Said simulated inspection process may comprise an execution on the computer of said at least one preselected operation type block of said multiplicity of operation type blocks.

Said at least one preselected operation type block may perform at least one operation which processes said multiplicity of images of said at least one preselected image input type block. The images may be processed one at a time or more than one at a time.

Said at least one preselected operation type block may perform at least one operation which computes and displays at least one time period 113 required to carry out said at least one operation.

Said simulated inspection process may comprise an execution on the computer of said at least one preselected sorting type block of said multiplicity of sorting type blocks, which comprises a sorting operation suitable for and in particular configured to control the inspection machine to reject samples which comprise at least one defect.

In a second aspect the invention relates to a graphical programming interface for programming a sample inspection process, wherein said graphical programming interface may be implemented on a computer comprising at least one processor and at least one memory.

Said inspection process may be suitable for and in particular configured to control an inspection machine. The inspection machine may be connected to the computer or connected to a second computer on which the inspection process programmed with the graphical programming interface is executed.

Said inspection process is an image recognition process of sample defects.

Said inspection process may comprise at least one operation which processes images depicting samples. The images may be processed one at a time or more than one at a time.

The graphical programming interface may comprise at least one image input type block, which may comprise an input into said at least one memory of a multiplicity of images of at least one sample.

The graphical programming interface may comprise a multiplicity of operation type blocks.

Each operation type block may comprise at least one operation which processes images.

The graphical programming interface may comprise at least one sorting type block and preferably a multiplicity of sorting type blocks.

The graphical programming interface may allow to select at least one image input type block, if more than one input type block is provided for, at least one operation type block among said multiplicity of operation type blocks, and at least one sorting type block among said multiplicity of sorting type blocks.

The graphical programming interface may simulate the inspection process under programming, thereby implementing a simulated inspection process.

Said simulated inspection process may comprise an execution on the computer of said at least one preselected image input type block.

Said simulated inspection process may comprise an execution on the computer of said at least one preselected operation type block of said multiplicity of operation type blocks.

Said at least one preselected operation type block may perform at least one operation which processes said multiplicity of images of said at least one preselected image input type block. The images may be processed one at a time or more than one at a time.

Said simulated inspection process may comprise an execution on the computer of said at least one preselected sorting type block of said multiplicity of sorting type blocks, which comprises a sorting operation suitable for and in particular configured to control the inspection machine to reject samples which comprise at least one defect.

Said at least one preselected operation type block may comprise at least one operation parameter for configuring at least one operation carried out by said at least one operation type block and/or said at least one preselected sorting type block may comprise at least one sorting parameter for configuring at least one operation carried out by said at least one preselected sorting type block.

Said graphical programming interface may allow said at least one operation parameter and/or said at least one sorting parameter to be configured.

In a third aspect the invention relates to a graphical programming interface for programming a sample inspection process, wherein said graphical programming interface is implemented on a computer comprising at least one processor and at least one memory.

Said inspection process may be suitable for and in particular configured to control an inspection machine. The inspection machine may be connected to the computer or connected to a second computer on which the inspection process programmed with the graphical programming interface is executed.

Said inspection process is an image recognition process of sample defects.

Said inspection process may comprise at least one operation which processes images depicting samples. The images may be processed one at a time or more than one at a time.

The graphical programming interface may comprise at least one image input type block, which may comprise an input into said at least one memory of a multiplicity of images of at least one sample.

The graphical programming interface may comprise a multiplicity of operation type blocks.

Each operation type block may comprise at least one operation which processes images.

The graphical programming interface may comprise at least one sorting type block and preferably a multiplicity of sorting type blocks.

The graphical programming interface may allow to select at least one image input type block, if more than one input type block is provided for, at least one operation type block among said multiplicity of operation type blocks, and at least one sorting type block, if more than one sorting type block is provided.

The graphical programming interface may simulate the inspection process under programming, thereby implementing a simulated inspection process.

Said simulated inspection process may comprise an execution on the computer of said at least one preselected image input type block.

Said simulated inspection process may comprise an execution on the computer of said at least one preselected operation type block of said multiplicity of operation type blocks.

Said at least one preselected operation type block may perform at least one operation which processes said multiplicity of images of said at least one preselected image input type block.

Said at least one preselected operation type block may comprise at least one operation parameter for configuring at least one operation performed by said at least one operation type block and/or said at least one preselected sorting type block may comprise at least one sorting parameter for configuring at least one operation performed by said at least one preselected sorting type block.

Said graphical programming interface may allow said at least one operation parameter and/or said at least one sorting parameter to be configured.

Said graphical programming interface may allow to select whether to display said at least one operation parameter and/or said at least one sorting parameter in said simulated inspection process or not, and whether to allow it to be modified or not.

Alternatively or additionally, said graphical programming interface may allow to select whether to display said at least one operation parameter and/or said at least one sorting parameter in a computer program implemented through said graphical programming interface, or programmed sample inspection process, or not, and whether to allow it to be modified or not.

The graphical programming interface may comprise an execution on the computer of at least one preselected sorting type block of said multiplicity of sorting type blocks which comprises a sorting operation suitable for and in particular configured to control the inspection machine to reject samples which comprise at least one defect.

In a fourth aspect, the invention relates to a graphical programming interface for programming a sample inspection process, wherein said graphical programming interface may be implemented on a computer comprising at least one processor and at least one memory.

Said inspection process may be suitable for and in particular configured to control an inspection machine. The inspection machine may be connected to the computer or connected to a second computer on which the inspection process programmed with the graphical programming interface is executed.

Said inspection process is an image recognition process of sample defects.

Said inspection process may comprise at least one operation which processes images depicting samples. The images may be processed one at a time or more than one at a time.

The graphical programming interface may comprise at least one image input type block, which may comprise an input into said at least one memory of a multiplicity of images of at least one sample.

The graphical programming interface may comprise a multiplicity of operation type blocks.

Each operation type block may comprise at least one operation which processes images.

The graphical programming interface may comprise at least one multiplicity of sorting type blocks.

The graphical programming interface may allow to select at least one image input type block, if more than one input type blocks are provided for, at least one operation type block among said multiplicity of operation type blocks, and at least one sorting type block among said multiplicity of sorting type blocks.

The graphical programming interface may simulate the inspection process under programming, thereby implementing a simulated inspection process.

Said simulated inspection process may comprise an execution on the computer of said at least one preselected image input type block.

Said simulated inspection process may comprise an execution on the computer of said at least one preselected operation type block of said multiplicity of operation type blocks.

Said at least one preselected operation type block may perform at least one operation which processes said multiplicity of images of said at least one preselected image input type block. The images may be processed one at a time or more than one at a time.

Said simulated inspection process may comprise an execution on the computer of at least one preselected sorting type block of said multiplicity of sorting type blocks which comprises a sorting operation suitable for and in particular configured to control the inspection machine to reject samples which comprise at least one defect.

Said at least one preselected operation type block may comprise at least one operation parameter for configuring at least one operation carried out by said at least one operation type block and/or said at least one preselected sorting type block may comprise at least one sorting parameter for configuring at least one operation carried out by said at least one preselected sorting type block.

Said graphical programming interface may allow said at least one operation parameter and/or said at least one sorting parameter to be configured.

Said graphical programming interface may allow to select whether to activate said at least one sorting parameter in said simulated inspection process so that if said at least one sorting parameter is activated, said at least one sorting type block which comprises said at least one sorting parameter uses said at least one sorting parameter.

Said graphical programming interface may allow to select whether to activate said at least one sorting parameter in a computer program implemented through said graphical programming interface, or programmed sample inspection process, or not, so that if said at least one sorting parameter is activated, said at least one preselected sorting type block which comprises said at least one sorting parameter uses said at least one sorting parameter.

In each of the above aspects, said at least one operation type block comprises at least one operation parameter for configuring at least one operation performed by said at least one operation type block and/or said at least one sorting type block comprises at least one sorting parameter for configuring at least one operation performed by said at least one sorting type block, wherein said graphical programming interface allows said at least one operation parameter and/or said at least one sorting parameter to be configured.

The graphical programming interface may allow to select whether to display said at least one operation parameter and/or said at least one sorting parameter in said simulated inspection process, and/or in a computer program implemented through said graphical programming interface, or programmed sample inspection process, or not.

In each of the above aspects, said graphical programming interface may comprise a multiplicity of feedback type blocks, wherein each feedback type block of said multiplicity of feedback type blocks may be suitable to be applied to an output of any operation type block and/or of any sorting type block, displaying results of the operation provided for in said any operation type block and/or of said any sorting type block.

The graphical programming interface may allow at least one feedback or evaluation type block to be selected among said multiplicity of feedback type blocks, and to be applied at the output of a respective preselected operation type block and/or of a respective preselected sorting type block.

Said simulated inspection process may comprise an execution on the computer of at least one preselected feedback type block of said multiplicity of feedback type blocks.

In each of the above aspects, said at least one operation type block may compute and/or display a minimum time period and/or a maximum time period and/or an average time period required to carry out said at least one operation on a multiplicity of images provided by said at least one preselected image input type block.

Said minimum time period and/or a maximum time period and/or an average time period may be zeroed or not at the user's discretion and/or automatically. For example, one or more among them may be zeroed as said at least one preselected image input type block changes, and thus when the input set of images is changed, or when a parameter of the operation type block itself or of a block upstream thereto is changed, etc., so as to better evaluate the impact of the changes made.

In each of the above aspects, furthermore, one or more of the following secondary features may be present.

Said graphical programming interface may compute and/or display a total time interval required to implement said simulated inspection process.

Said images may be portions of images of said samples.

Said image input type block may comprise only output ports.

Said operation type blocks may comprise input and output ports.

Said sorting type blocks may comprise both input ports and optionally output ports.

Feedback type blocks may comprise only input ports.

Operation type blocks may compute at least one feature once at least one input is provided at the input port.

Operation type blocks may comprise at least one operation applied to images and/or to selected regions of images and/or to scalars derived by an analysis of said images and/or regions thereof by the operation type block or by the analysis of parameters of the operation by the operation type block.

The operation may be selected from the group consisting of a filtering operation, an operation for selecting a region of the image, a processing operation.

The processing operation may be selected from the group consisting of operations for processing through logic operators or blur or crop or resize or threshold or dilation or erosion or intersection or union or sum or subtraction or average or median or inverse or other analogous operations which are known and used for comparing or merging plural images and/or regions thereof with each other or other analogous operations which are known for processing images and/or regions thereof, an operation for computing geometric features or coordinates, an operation for tracking a trajectory, an operation for computing parameters of images and/or regions thereof, wherein said parameters of images are comprised in a list which comprises size, roundness, axis x, y.

Operation type blocks may, alternatively or additionally, comprise at least one artificial intelligence module.

In a fifth aspect, the invention relates to a method for programming a product inspection process through a graphical programming interface as mentioned above.

The programming method may identify and/or may select at least one parameter which minimizes a total time interval required to implement said simulated inspection process.

Alternatively or additionally, the programming method may identify and/or may select at least one operation type block which minimizes a total time interval required to implement said simulated inspection process.

Alternatively or additionally, the programming method may identify and/or may select a multiplicity of operation type blocks which minimize a total time interval required to implement said simulated inspection process.

In a sixth aspect, the invention relates to a computer program implemented through a graphical programming interface, wherein said program is loadable in a memory of a computer, comprising instructions which, when the program is executed by the computer, implement an inspection process.

The processor may be distinct from or coinciding with the computer onto which the graphical programming interface is loaded and executed.

Further features are provided in the dependent claims.

Features and advantages of the present invention will become clearer from the following description, by way of a not limiting example, made with reference to the attached schematic drawings, wherein:

FIG. 1 is a schematic view of a graphical interface for programming an inspection machine according to the present invention;

FIG. 2 is a schematic view of an inspection machine comprising a conveying line, an image or video taking camera, a computer wherein a computer program is implemented, which implements a sample inspection process, a sorting device controlled by said computer, which rejects the samples comprising defects;

FIG. 3 is a block diagram of the inspection process;

FIG. 4 is a block diagram of a simulation of the inspection process implemented by the graphical programming interface;

FIG. 5 shows a block comprising check boxes for defining parameter visibility and/or capability to be used.

With reference to the cited figures and in particular to FIG. 1, a graphical programming interface 100 for programming an inspection machine 200 for inspecting products is shown. The graphical programming interface 100 is otherwise called GUI, English acronym for Graphic User Interface. The products may be of different kinds such as for example: filled or empty medicinal drug containers, tablets, syringes, other products related to pharmaceutical packaging. The inspection machine 200 is preferably configured for the above listed types of products.

During an inspection session, the inspection machine 200 inspects products of a same kind, which are called samples 10.

As shown in the diagram of FIG. 2, the inspection machine 200 comprises at least one conveying line 210 for conveying samples 10, at least one camera 230 for taking images 30 or video, at least one computer 300 wherein a computer program is implemented, which implements an inspection process 50 of samples 10, at least one sorting device 220 controlled by said computer 300, which rejects the samples 10 comprising defects 20, otherwise called flawed samples.

The graphical user interface 100 is implemented on the computer 300, comprising at least one processor 301 and at least one memory 302.

The graphical programming interface 100 programs a mathematical algorithm which is then implemented on the computer 300.

The mathematical algorithm programmed through the graphical programming interface 100 is the computer program 300 which implements the inspection process 50 of samples 10 and controls the operation of the inspection machine 200 to reject flawed samples from the conveying line 210.

The inspection process 50 of samples 10 is a process for recognizing, by images 30, defects 20 of samples 10.

The inspection process 50 is implemented in the form of a computer program loadable in the memory 302 of the computer 300 comprising instructions which, when the program is executed by the processor 300, implement the inspection process 50.

The graphical programming interface 100 is loaded on the processor 300 connected to the inspection machine 200 to implement the inspection process 50, or on an external processor (not shown) which is inputted with images 30 collected by the machine 200 even without being physically and logically connected thereto, namely being in a completely offline mode.

In the case of distinct processors for programming and for implementing the inspection process 50, the processors are configured so as to have the same performance.

Images 30 depicting said samples 10 are taken by the at least one camera 230 logically connected with said computer 300 by means of at least one connection 323 suitable for transmitting to said at least one memory 302 the images 30 depicting said samples 10.

Preferably said samples 10 move on the conveying line 210 of the inspection machine 200 and the images 30 depicting said samples 10 are taken by said at least one camera 230 within a predetermined time interval.

Preferably the shootings of the images 30 of camera 230 occur while the samples 10 move, conveyed by the conveying line 210, and the predetermined time interval for the shooting by the camera 230 depends at least on the conveying speed of the samples 10 on the conveying line 210.

There is a maximum time interval, called identification time, within which any identification of the defect 20 has to occur, short of causing a slowing down/stop of the machine 200 or a failed inspection of the sample 20. The identification time is also determined by the conveying speed of the machine, which is generally desired to be maximized.

It is possible to provide that there is a multiplicity of sorting devices 220, each one logically connected with said computer 300.

The inspection process 50 of samples 10 comprises an input 51 in said at least one memory 302 of at least one collection formed of a multiplicity of said images 30 taken by said at least one camera 230 and depicting a sample 10 and preferably a multiplicity of said samples 10. Each sample 10 of said multiplicity of samples 10 is taken several times by the camera 230 and is therefore depicted in a sub-collection formed by a multiplicity of images 30, also called frames, which preferably depict the same sample 10 taken from different points of view, wherein preferably the sample 10 is rotated about its own axis so as to be shown from different angles in favour of the camera 230. The multiplicity of images 30 of said sub-collection of said multiplicity of images 30 of each single sample 10 forms, together with other sub-collections of said multiplicity of images 30 of other samples 10, said collection of said multiplicity of images 30 of all the samples 10 involved in the analysis.

Each sample 10 of said multiplicity of said samples 10 is classified as a function of at least one acceptance criterion.

Said at least one acceptance criterion is evaluated based on the images 30 depicting said sample 10, suitably processed by one or more operations 110.

The processing of the operations 110 is suitable for emphasizing the defects and/or for assisting in evaluating said at least one acceptance criterion.

The acceptance criterion may be for example linked to a threshold parameter, namely a parameter having a threshold value associated thereto, or the acceptance criterion may be for example linked to a range of values of one or more parameters.

The inspection process 50 of samples 10 comprises a multiplicity of operations 110, wherein an operation 110 is carried out on the data or on the image 30 or on the region of image 30 defined by an input mask 101. Hereinbelow, sometimes the expression region 101 will be used for the sake of brevity, to indicate a region of image 30 defined by a mask 101.

The inspection process 50 of samples 10 comprises a multiplicity of sorting operations 52, wherein each sorting operation 52 of said multiplicity of sorting operations 52 evaluates at least one acceptance criterion of said images 30.

Each sample 10 of said multiplicity of samples 10 is classified as acceptable sample if all the defects visible in the images 30 of said sample 10, suitably processed by said one or more operations 110, respond to said acceptance criterion, or as flawed sample if at least one defect visible in the images 30 of said sample 10, suitably processed by said one or more operations 110, does not respond to said acceptance criterion.

In the present description and in the attached claims, under term "visible" and derived forms, is meant "identifiable by a processor", not necessarily visible for the human operator.

The inspection process 50 comprises at least one sorting operation 52 which controls the sorting device 220 of the inspection machine 200 to reject the sample 10 classified as flawed sample. The rejection may occur physically as schematically shown in FIG. 2, expelling the sample 10 from the production line, or it may occur through a suitable marking of the sample 10 which allows it to be expelled later.

The multiplicity of operations 110 to which the images 30 of the sample 10 are subject for processing thereof are graphically represented on the graphical programming interface 100 as blocks 110, see FIG. 1. On the graphical programming interface 100 also other operations, better described hereinbelow, are graphically represented as blocks 110, 111, 112, 120. The graphical programming interface 100 comprises a choice area 104 where the blocks 110, 111, 112, 120 may be selected, and an operating area 105 where the preselected blocks 110, 111, 112, 120 are combined in a graph.

The user drags the preselected blocks 110, 111, 112, 120 from the choice area 104 to the operating area 105 and drops them in the portion of the operating area 105 where he/she wishes them to be inserted in the operation flow.

The graphical programming interface 100 comprises at least one image input type block 111, a multiplicity of operation type blocks 110, at least one and preferably a multiplicity of sorting type blocks 112 and, preferably, at least one and preferably a multiplicity of feedback type blocks 120.

The graphical programming interface 100 allows at least one image input type block 111, at least one operation type block 110, at least one sorting type block 112 and preferably at least one feedback type block 120 to be selected.

Each input image type block 111 represents the images 30 of one or more samples 10, namely products of a same kind, and in particular comprises the input in memory 302 of the images 30 of one or more samples 10. The images 30 may, in turn, arrive from camera 230 or be loaded from a mass memory location wherein images taken by camera 230 have been previously loaded.

In the graph represented in the operating area 105 in FIG. 1, the input image type block 111 does not have any input port, rather only output ports.

Each input image type block 111 may represent, alternatively or additionally, also data of a different type besides images.

Each input image type block 111 comprises an output port which may make raw images and/or regions, which are portions of images 30 defined by a binary mask 101, and/or scalars, available.

The scalars may be for example a number of channels of the image 30, or numbers identifying the vertexes of a closed region 101 of the image 30 or of a mask.

An image input type block 111 serves to generate the data which are then used in a graph linking blocks 111, 110, 112, 120, shown merely as an example in FIG. 1. Lines of the graph represent logic links between blocks 111, 110, 112, 120.

The data may be images 30, masks or scalars, as mentioned above.

An image datum comprises one or more images 30 of a same sample 10, alternatively there may be a single image 30 for each sample 10, or respective regions.

A mask datum, also called shape or blob, may for example comprise a preselected region of each of N images 30.

A mask type datum 101 may for example be a 0/1 map for identifying contiguous image parts defining an image region onto which, for example, one or more operations on the images 30 should be limited, also in order to speed up the processing.

A scalar datum is a datum of the numerical array type, namely a number or a number sequence. It may be divided in a hierarchical manner as if it were a region datum, namely there may be a global number sequence, associated with the datum, and/or a number sequence for each image 30 and/or a number sequence for each region 101.

Alternatively or additionally, an operation 110 for selecting a portion of the image 30 through a datum of the region type 101 may be carried out by a suitable operation type block 110.

The images 30 may thus also be, broadly speaking, portions of images 30 of samples 10 defined, for example, by extraction and possible binarization of regions thereof defined by masks 101. Hereinbelow, when images 30 are referred to, also image regions are meant to be encompassed, unless otherwise specified.

For example, the preselected input image type block 111 shown in FIG. 1 collects the sub-collection of the multiplicity of images 30 of a same sample 10 taken by camera 230, the so-called frames. The images 30 not yet processed arriving from the camera 230 are also called raw images.

For example the input image type block 111 may generate a mask, which is a region 101 with preset size and shape.

For example the input image type block 111 may generate a scalar with determined numbers which show selected parameters of the image 30 under consideration.

Feedback type blocks 120 do not have any output port, rather only input ports, and serve to show results which may be for example images 30 processed by one or more previous blocks, or scalar data processed by one or more previous blocks. In FIG. 1, a processed image 30 is shown merely by way of example, wherein the defect 20 is well visible in the last feedback type block 120.

A sorting type block 112 comprises the sorting operation 52 for controlling the inspection machine 200 when the inspection process programmed with the graphical programming interface 100 is executed.

Operation type blocks 110 comprise both input ports and output ports.

Sorting type blocks comprise input ports, and optionally output ports.

Sorting type blocks 112 do not necessarily comprise output ports, but may optionally have an output which may be connected with a feedback block 120.

The blocks 11, 110, 112, 120 are ordered in the operating zone 105 from left to right in FIG. 1 following the lines of the represented graph, which define an execution sequence of blocks 111, 110, 112, 120.

Other feedback type blocks 120 may display scalars, namely values of parameters or numerical values which represent a given feature of the image 30 under analysis.

Feedback type blocks 120 may be logically connected with output ports of any operation type block 110 or sorting type block 112 in order to display the image 30 processed by the individual block to which it is connected, and possibly by the blocks connected upstream to the latter.

Sorting type blocks 112 serve to analyze the goodness of a collection of analyzed images 30, and return an output datum, and serve for example to give the final classification of the sample 10, whether passable or flawed and thus to be rejected. The classification is made based on acceptance criteria which may for example be related with minimum and/or maximum values on the features represented by parameters of the operation type blocks 110. A sample may be classified as bad (BAD) if at least one image has a feature evaluated on the image higher than a threshold value of one of the acceptance criteria.

For example, a sorting type block 112 is displayed with a green or red outline according to whether the sorting criterium defined therein has given a GOOD or a BAD outcome. If for example the value that generated an output of the BAD type is a number, the sorting type block 112 may optionally have an output which is connected to a feedback type block 120 which displays the value of that number. If the sorting type block 112 provides an output of the BAD type in case two regions 101 classified as air bubbles are identified, it may optionally have an output which is connected to a feedback type block 120 that displays the image of the two regions 101. Thus, the sorting type blocks 112 comprise at least one input port.

By feature, any parameter of the image output by an operation type block 110 is meant, for example the size in pixels of a region 101 which has been classified as defect 20, the number of regions of the image which have been classified as defect 20, a numerical value, such as for example the average gray level within a region of the image 30 defined by a mask 101. The feature is compared with a threshold value or with a minimum and maximum value which represents the acceptance criterion thereof. For example, if the number of regions defined by a respective mask 101 is greater than a threshold, or the grey level is within a minimum/maximum range. Other examples of features are the number of images 30 of a same sample 10, the resolution of the camera 230, etc. Moreover, there are features for each image 30, such as for example the average level of the image color. By features of the regions defined by masks 101 at the level of an image 30, for example the number of regions 101 of that image 30, the sum of the areas of the regions defined by masks 101 of the image 30, etc., are meant. Moreover, there are features for each mask 101, for example the size thereof, the position x, y in the image 30, the roundness, the geometric shape, etc.

As shown in FIG. 1, feedback type blocks 120 may be applied to the individual operation type block 110 so as to show an output value at the output of the processing operation 110 of the image 30. Feedback type blocks 120 advantageously allow the results of the processing of the image 30 to be evaluated for each operation 110 performed by the inspection process 50.

Operation type blocks 110 may process images 30 and/or selected regions of images 30 and/or scalars derived by the analysis of said images 30 or by the analysis of parameters of the operation 110.

The feedback type blocks 120 display the output, which may be an image 30 processed by operations 110 or a processed region of the image 30, defined by a mask 101 or blob, or scalars. In particular, the processed region is a result coming from an image input type block 111 defining a mask 101 within it, or by an operation type block 110 defining the mask 101.

Operation type blocks 110 comprise at least one input and at least one output and are able to process images 30 depicting samples 10.

Operation type blocks 110 comprise at least one operation 110 for processing images 30, for example blur, crop, resize, threshold, and other analogous operations known in the state of the art for processing images 30, or operations 110 on regions 101 of the images 30 such as for example dilation, erosion, intersection, union, and other analogous operations known in the state of the art for processing images 30, or scalar operations such as for example sum, subtraction, average, median, inverse and other analogous operations known in the state of the art and used to compare or merge several images 30 with each other.

Operation type blocks 110 may also be operations 110 computing a feature once an input is provided. For example the operation block 110 which computes geometric features of the regions 101 will receive as input a region 101 of the image 30, will carry out a cycle of operations on all regions 101 of all images 30 of a single sample 10, and for each region 101 it will compute the geometric features such as for example area, axis x, axis y, which are associated with each region 101 representing the defect 20.

Operation type blocks 110 may be blocks which in the graphical programming interface 100 are called feature type blocks, which have as input an image 30 or a region 101 and which compute parameters, such as for example parameters comprised in a list comprising size, roundness, axes x, y etcetera, of one or more regions 101 in order to use them in a subsequent operation type block 110.

Operation type blocks 110 may apply filters filtering the input data, namely removing or keeping given images and/or regions defined by masks 101. For example it is possible to analyze the size of a series of regions defined by masks 101 or blobs, extracted from the image 30 in a previous step, and remove the regions having an area smaller than a certain size. For example the output datum will be the input datum deprived of the regions defined by masks 101 of a too small area.

For example an operation type block 110 may be applied for filtering at the level of image 30 if for example it is wished to retain images 30 with a determined parameter which represents a level of colour intensity or of luminosity within a preselected range or beyond a preselected threshold value. In this case, the output image datum will be deprived of the images 30 which do not meet a given color or luminosity level, namely if lower or vice versa higher than a given color or luminosity level, or internal or external to a preselected range.

Operation type blocks 110 may comprise an operation of the trajectory type which processes a set of images 30 or frames of a same sample 10 which rotates about its own axis or follows a trajectory, for example while it is conveyed by a conveyor belt.

Operation type blocks 110 may apply algorithms to the data, comprising artificial intelligence modules. The operations 110 comprising artificial intelligence modules are for example deep learning algorithms or artificial neural networks. Thus, given an input, the operation type blocks 110 which comprise artificial intelligence modules compute an output using a neural network which is pre-trained.

Commonly, the Deep Learning systems operate on graphical inputs and provide as output a pass/fail value, for example in terms of probability that a region 101 or an image 30 contains a defect 20, or of classifying the region, for example the output may be a series of regions defined by binary masks 101 containing a type of defect 20, each paired for example with a value of the probability and of the type of defect 20, while those of Machine Learning operate on numerical values.

Still other operation type blocks 110 comprise logic operations 110 to regulate an operation flow. For example the implemented logic operations 110 may be cycles such as for example a FOR cycle, or conditional operations such as for example IF-THEN-ELSE. These operations 110 allow more complex logic operations to be performed, such as for example given paths of the graph to be selected based on preset conditions, or conditions computed during the operations 110, or operations 110 to be repeated for a number of times.

Advantageously, as mentioned above, the user of the graphical programming interface 100 may select operations 110 for processing images 30, as well as the input image blocks 111, feedback blocks 120, sorting blocks 112, from a library present in memory 302 and displayed in the choice area 104 of the graphical programming interface 100 in FIG. 1.

Advantageously each or at least one operation type block 110 and/or each or at least one sorting type block 112 comprises at least one parameter which may be configured or selected according to the operation 110 which one wishes to complete on images 30, regions 101 or scalar data. Preferably, each or at least one operation type block 110 and/or each or at least one sorting type block 112 comprises a multiplicity of parameters that may be configured or selected, so that each operation 110 and/or each sorting operation 112 may be configurable through desired parameters.

Advantageously each or at least one operation type block 110 and/or each or at least one sorting type block 112 comprises at least one parameter which may be shown or hidden in the inspection program programmed with the graphical programming interface 100, as for example shown in FIG. 5 where check boxes associated with each parameter of a list of parameters are shown.

The programmed inspection program may be shown, along with other alternative inspection programs, in a higher-lever interface which comprises a series of preset programs for the inspection process 50 suitable to be carried out on the processor 300 for controlling the inspection machine 200, among which one or more inspection processes programmed with the graphical programming interface 100 disclosed herein. The higher-level interface shows a multiplicity of parameters of all operations 110 provided for in the preset programs. The graphical programming interface 100 advantageously allows the number of parameters which one wishes to display for analysis thereof by an operator to be reduced, and to optimize which ones they are; or, in an execution step of the simulated inspection process 53, the parameters to be displayed and/or, concerning the sorting type blocks 112, the parameters to be used or not to be used, may be selected.

More in general, at least one of these parameters related to at least one operation of an operation type block 110 and/or of a sorting type block 112 may be shown or hidden during the simulated inspection process 53 and/or in the program created by the graphical programming interface 100. Advantageously the graphical programming interface 100 allows only part of the parameters of each operation block 110 and/or sorting block 112 to be displayed, at the user's choice.

Relating to the sorting type blocks 112, more in general, at least one of these parameters related to at least one operation may be activated or not so that the sorting type block 112 which provides for it may either use it or not during the simulated inspection process 53 and/or in the program created by the graphical programming interface 100, namely in the inspection process 50. Advantageously the graphical programming interface 100 allows only part of the parameters of each sorting type block 112 to be activated, at the user's choice.

The graphical programming interface 100 may further comprise block-note type blocks which are used for writing comments in the graph, so as to make it easier to understand its operation (not shown in the figure).

Advantageously it is possible to provide for the above-described blocks to be graphically included in multi-node blocks in order to simplify the graphical display of the operations 110 to be applied to the images 30 and/or to quickly repeat blocks of operations in several points in the simulated program 53 or in the inspection process 50.

The graphical programming interface 100 allows, according to an aspect of the invention, the processing times requested by the operations 110 applied to the images 30 to be analyzed.

The time computation is performed by storing in memory 302, for each block 110, the minimum, average and maximum computation time which is required to compute the outputs of the block 110 or of the series of blocks 110 upstream of the block 110 under consideration. The times may be displayed in a portion 113 of any preselected block 110 as shown in FIG. 1.

Each operation type block 110 computes a time interval required to process the images 30. The time interval may represent a time interval required to process a single image 30 and/or a time interval required to process an image collection 30 of a same sample 10.

The time interval may also be an average time interval, wherein the applied operation 110 computes an average relative to all the time intervals required to process a sample of images 30 comprising all images 30 of a single sample 10, and/or to compute the average relative to all the time intervals required to process a sample of images 30 comprising all images 30 of all samples 10.

Preferably the minimum time interval and the maximum time interval are stored in memory 302, besides the average time interval.

The counters may be zeroed at the request of the user of the graphical programming interface 100.

The graphical programming interface 100 simulates 53 the inspection process 50 on a predefined collection of images 30 representing one or more samples 10.

The simulation 53 of the inspection process 50 provides for operating on the operation type blocks 110 by adding or removing one or more operations 110 for processing images 30, and/or by modifying parameters of each individual operation block 110 and/or of each individual sorting block 112.

The simulated inspection process 53 implemented through the graphical programming interface 100 comprises an execution on the computer 300 of said at least one preselected image input type block 111, of at least one preselected operation type block 110, of at least one preselected sorting type block 112 which comprises a sorting operation 52 suitable for controlling the inspection machine 200 to reject samples 10 comprising at least one defect 20, wherein said at least one operation type block 110 performs at least one operation 110 which processes said multiplicity of images 30 of said input image type block 111, computes and displays in portion 113 at least one time period required to carry out said at least one operation 110.

Preferably said at least one operation type block 110 performs at least one operation 110 which processes said multiplicity of images 30 of said input image type block 111 or of a previous operation type block 110, computing and displaying at least one parameter of said at least one operation 110 performed by the operation type block 110.

Each time even a single parameter in a single operation block 110 and/or in a single sorting block 112 is changed, the graphical programming interface 100 simulates 53 the inspection process 50, so as to allow the best parameters to be identified in order to obtain an identification of the defects 20 as well as an improvement of the operation times of the inspection process 50, so as to advantageously allow these times to be reduced and/or the number of parameters needed to process images 30 to be reduced.

The simulation process 53 is carried out on an image collection 30 represented by the input image type block 111, therefore an image collection 30 of a single sample 10 may be selected if one wishes to simulate 53 the identification of a defect 20 on a single sample, or an image collection 30 of several samples 10 may be selected so as to be able to more accurately compute the processing times of each operation type block 110.

Preferably the simulation process 53 is carried out on an image collection 30 represented by the input image type block 111, therefore an image collection 30 of a single sample 10 may be selected if one wishes to simulate 53 the identification of a defect 20 on a single sample, or an image collection 30 of several samples 10 may be selected so as to be able to evaluate which processing operations 110 should be used in order to reduce the used parameters and/or reduce the time period for performing the inspection process 50.

The graphical programming interface 100 saves the algorithm corresponding to the preselected blocks 111, 110, 112, 120 and parameters, executed by the simulated inspection process 53 which proves to be satisfactory, for example that minimizes the simulation times 53. It is furthermore possible to also include the blocks 120 in the algorithm, in order to display the image 30 or the region 101 processed by the operations carried out by the previous blocks also during the execution of the algorithm. The algorithm is in the form of a software program which is loaded in the memory 302 of the computer 300 logically connected with the inspection machine 200 so that when the program is executed by the processor 301 of the computer 300, it makes the inspection machine 200 operate.

Advantageously the time periods required to process images 30 are re-computed in the simulated inspection process 53 each time the input image collection 30 changes and/or each time at least one parameter of the operations of the operation type blocks 110 (sometimes briefly operations 110 hereinbelow) and/or of the sorting blocks 112 is changed, for example the time period is re-computed each time an image collection 30 representing a single sample 10 is loaded, and/or each time at least one parameter of the operations 110 is changed.

Furthermore, a total time period for implementing said simulated inspection process 53 for identifying defects 20 of samples 10 thorough their images 30 is computed.

In this manner, the inspection process 50 is simulated 53, thus finding the best parameters of the operations 110, 112 and/or the best operations 110, 112 which minimize the times required to implement it.

Once the parameters of the operations 110, 112 and the operations 110, 112 necessary and sufficient to minimize the times of the inspection process 50 have been defined, of course obtaining an adequate and correct pass rate, the resulting mathematical algorithm is loaded on the computer 300 which operates the inspection machine 200, allowing the flawed samples to be rejected. Under the expression "correct", it is meant that the result is sufficiently close to that of rejecting all and only those samples 10 which are actually flawed.

The parameters of the operations 110 and of the sorting blocks 112 and the operations 110 that minimize the operating times of the inspection process 50 depend on the type of defect 20 present on the sample 10, thus they should be configured based on the statistics of the defects 20 of the considered samples 10.

Advantageously the graphical programming interface 100 allows both programming and simulating 53 the inspection process 50 of samples 10 in order to optimize that process 50 in terms of number of parameters and of number of operations 110 for processing images 30 involved and/or in terms of time reduction.

Advantageously, the graphical programming interface 100 allows the efficiency of the simulated process 50 to be analyzed during the programming of the operations 110 and of the sorting blocks 112 on data, allowing to interactively intervene in any point of the flow of operations 110, 112 forming the inspection process 50.

Advantageously the graphical programming interface 100 allows both the type of processing operations 110 and the parameters used for each single operation 110 which are carried out on the image 30 of the sample 10 or on the sequence of images 30 of the sample under analysis, and the acceptance, rejection, classification criteria of the images 30 of the sample 10 for each single sorting block 112, to be modified, thus offering the opportunity to customize the algorithm of the inspection process 50 at will, without having to write any software source code.

Advantageously the graphical programming interface 100 allows the user to check in a simple and quick manner the final efficiency of the selected operations 110 for processing the image 30 in order to recognize and correctly classify the defects 20 of the sample 10, considering the impact of each individual step of analysis of the image 30 on the final result and on the inspection timing of the inspection process 50.

Advantageously, with the feedback blocks 120, the images 30 may be visually evaluated at each processing stage.

Alternatively, it is possible to provide for two different input image type blocks 111 to be included in the active zone 105. For example, if the sample 10 is taken by its cameras 230 from two different angles, for example from one side and from above, two parallel processing paths for two sets of different images 30 may be provided for, and a sorting type block 112 may be defined if no defect is detected from any of the angles.

The invention further defines a method for programming the inspection process 50 of samples 10 through the above-described graphical programming interface 100.

Advantageously, the programming method allows those parameters of at least one operation 110 and/or of each sorting block 112 to be identified and made available to the user, which are deemed of significance for implementing said simulated inspection process 53.

Advantageously, the programming method allows at least one operation type block 110 and/or each sorting block 112 to be identified and used, which minimizes a total time interval required to implement said simulated inspection process 53.

Advantageously, the programming method allows a multiplicity of operation type blocks 110 and/or parameters of operations 110 and/or of sorting blocks 112 and/or of sorting parameters 112 to be identified and used, which minimize a total time interval required to implement said simulated inspection process 53.

Advantageously, the programming method allows the inspection process 50 of samples 10 to be both programmed and simulated in order to optimize said process 50 in terms of number of parameters and of number of operations 110 for processing images 30 involved and/or in terms of time reduction.

Advantageously, the programming method allows both the type of processing operations 110 which are carried out on the image 30 of the sample 10 or on the sequence of images 30 of the sample under analysis, and the acceptance, rejection, classification criteria of the images 30 of the sample 10 evaluated by the sorting blocks 112, to be changed, thus offering the opportunity to customize the algorithm of the inspection process 50 at will, without having to write any software source code.

Advantageously, the programming method allows the user to check in a simple and quick manner the final efficiency of the selected operations 110, 112 for processing the image 30 in order to recognize and correctly classify the defects 20 of the sample 10, considering the impact of each individual step of analysis of the image 30 on the final result and on the inspection timing of the inspection process 50.

The invention provides for the computer program implemented through said graphical programming interface 100 of an inspection process 50 of samples 10, according to what has been described above, wherein said program is loadable in the memory 302 of the computer 300 and comprises instructions which, when the program is executed by the computer 300, implement an inspection process 50 thus operating the inspection machine 200.

Advantageously, the program allows such process 50 to be optimized in terms of number of parameters and of number of operations 110 for processing images 30 and of sorting operations 112 involved and/or in terms of time reduction.

Advantageously, the program optimizes the final efficiency of the operations 110 for processing the image 30 and of sorting operations 112 selected in order to recognize and correctly classify the defects 20 of the sample 10, considering the impact of each individual step of analysis of the image 30 on the final result and on the inspection timing of the inspection process 50.

The invention as thus conceived is susceptible to numerous changes and variants, all falling within the scope of the inventive concept. In practice, the materials used, as well as the size, may be whatever according to the technical requirements.

The invention claimed is:

1. A graphical programming interface for programming an inspection process, wherein said graphical programming interface is implemented on a computer comprising at least one processor and a memory, said inspection process is configured to be implemented on and control an inspection machine, said inspection process is an image recognition process that processes an image of a sample, and said inspection process comprises at least one computer-implemented operation, wherein the graphical programming interface is configured to:

display user-selectable blocks, including at least one image input type block, each comprising an input into said memory of a multiplicity of images of at least one sample, a multiplicity of operation type blocks, each comprising at least one operation that processes the multiplicity of images, and a multiplicity of sorting type blocks, receive, from among the displayed user-selectable blocks, a selection of a particular image input type block, a plurality of operation type blocks from among said multiplicity of operation type blocks, and a particular sorting type block from among said multiplicity of sorting type blocks, simulate the inspection process, thereby implementing a simulated inspection process, wherein said simulated inspection process implemented through the graphical programming interface comprises an execution, on the computer, of:

the selected particular image input type block, the selected plurality of operation type blocks, wherein the selected plurality of operation type blocks together perform a plurality of operations that processes said multiplicity of images of the selected particular image input type block, and each operation type block of the selected plurality of operation type blocks computes and displays at least one time period required to perform the at least one operation corresponding to the operation type block, and the selected particular sorting type block, which comprises a sorting operation to control the inspection machine to reject those samples that comprise at least one defect, and selectively output a computer program corresponding to the simulated inspection process for implementation on the processor or on an external processor.

2. The graphical programming interface according to claim 1, wherein each operation type block of the plurality of operation type blocks comprises at least one operation parameter for configuring the at least one operation performed by the operation type block and/or the particular sorting type block comprises at least one sorting parameter for configuring the sorting operation performed by the particular sorting type block, wherein said graphical programming interface is further configured to set said at least one operation parameter and/or said at least one sorting parameter.

3. The graphical programming interface according to claim 2, wherein the graphical programming interface is further configured to receive a selection indicating whether or not to display said at least one operation parameter and/or said at least one sorting parameter in said simulated inspection process, and/or in the computer program selectively output by said graphical programming interface, or programmed sample inspection process.

4. The graphical programming interface according to claim 2, wherein the graphical programming interface is further configured to receive a selection indicating whether or not to activate said at least one sorting parameter in said simulated inspection process and/or in the computer program selectively output by said graphical programming interface, or programmed sample inspection process, so that in response to the at least one sorting parameter being activated, the particular sorting type block, which comprises said at least one sorting parameter, uses said at least one sorting parameter.

5. The graphical programming interface according to claim 1, wherein the user-selectable blocks include a multiplicity of feedback type blocks, each feedback type block of said multiplicity of feedback type blocks is configured to be applied at an output of an operation type block of the selected plurality of operation type blocks and/or of the selected particular sorting type block, the feedback type block displaying results of an operation provided for in the corresponding operation type block and/or the selected particular sorting type block, wherein the graphical programming interface is further configured to receive a selection of a particular feedback type block from among said multiplicity of feedback type blocks, to be applied at the output of a respective operation type block of the selected plurality of operation type blocks and/or of the particular sorting type block, and wherein said simulated inspection process implemented through the graphical programming interface comprises an execution, on the computer, of the selected particular feedback type block.

6. The graphical programming interface according to claim 1, wherein each operation type block, of the selected plurality of operation type blocks, computes and displays a minimum time period and/or a maximum time period and/or an average time period required to perform said at least one operation, corresponding to the operation type block, on the multiplicity of images provided by the selected particular image input type block.

7. The graphical programming interface according to claim 1, wherein the graphical programming interface is further configured to compute and display a total time interval required to implement said simulated inspection process.

8. The graphical programming interface according to claim 1, wherein said multiplicity of images include portions of images.

9. The graphical programming interface according to claim 1, wherein the selected particular image input type block only comprises output ports, the selected plurality of operation type blocks each comprise input and output ports, and the particular sorting type block comprises at least one input port.

10. The graphical programming interface according to claim 5, wherein the selected particular feedback type block comprises only input ports.

11. The graphical programming interface according to claim 1, wherein each operation type block of the selected plurality of operation type blocks computes at least one feature based on at least one input being provided at an input port of the operation type block.

12. The graphical programming interface according to claim 1, wherein each operation type block of the selected plurality of operation type blocks comprises an operation applied to images and/or to selected regions of images and/or to scalars derived by an analysis of said images and/or regions thereof by the operation type block or by an analysis of parameters of the operation by the operation type block.

13. A non-transitory computer-readable medium storing computer instructions implementing the computer program selectively output by the graphical programming interface according to claim 1, wherein said instructions, when executed by the computer, implement the inspection process.

14. The graphical programming interface of claim 1, wherein the graphical programming interface is further configured to control the inspection machine to execute the computer program corresponding to the simulated inspection process so as to reject those samples that comprise the at least one defect; and each block of the selected plurality of operation type blocks computes and displays a minimum time, a maximum time, and an average time required to perform the at least one operation, corresponding to the particular block, on images of a sample.

15. The graphical programming interface of claim 1, wherein the graphical programming interface is further configured to control the inspection machine to execute the computer program corresponding to the simulated inspection process so as to reject those samples that comprise the at least one defect.

16. The graphical programming interface of claim 1, wherein each block of the selected plurality of operation type blocks computes and displays a minimum time, a maximum time, and an average time required to perform the at least one operation, corresponding to the particular block, on images of a sample.

17. The graphical programming interface of claim 12, wherein said operation is selected from a group consisting of a filtering operation, an operation for selecting a region of the image, a processing operation through logic operators or blur or crop or resize or threshold or dilation or erosion or intersection or union or sum or subtraction or average or median or inverse or other analogous operations for comparing or merging plural images and/or regions thereof with each other or other analogous operations for processing images and/or regions thereof, an operation for computing geometric features or coordinates, an operation for tracking a trajectory, an operation for computing parameters of images and/or regions thereof, wherein said parameters of images include a size or a roundness or a position x,y in the image and/or the operation type block comprises at least one artificial intelligence module.

18. A graphical programming interface for programming an inspection process, wherein said graphical programming interface is implemented on a computer comprising at least one processor and a memory, said inspection process is configured to be implemented on and control an inspection machine, said inspection process is an image recognition process that processes an image of a sample, and said inspection process comprises at least one computer-implemented operation, wherein the graphical programming interface is configured to:

display user-selectable blocks, including at least one image input type block, each comprising an input into said memory of a multiplicity of images of at least one sample, a multiplicity of operation type blocks, each comprising at least one operation that processes the multiplicity of images, and a multiplicity of sorting type blocks, receive, from among the displayed user-selectable blocks, a selection of a particular image input type block, a plurality of operation type blocks from among said multiplicity of operation type blocks, and a particular sorting type block from among said multiplicity of sorting type blocks, simulate the inspection process, thereby implementing a simulated inspection process, wherein said simulated inspection process implemented through the graphical programming interface comprises an execution, on the computer, of:

the selected particular image input type block, the selected plurality of operation type blocks, wherein the selected plurality of operation type blocks together perform a plurality of operations that processes said multiplicity of images of the selected particular image input type block, and each operation type block of the selected plurality of operation type blocks computes and displays at least one time period required to perform the at least one operation corresponding to the operation type block, and the selected particular sorting type block, which comprises a sorting operation to control the inspection machine to reject those samples that comprise at least one defect, and selectively output a computer program corresponding to the simulated inspection process for implementation on the processor or on an external processor, wherein each operation type block of the plurality of operation type blocks comprises at least one operation parameter for configuring the at least one operation performed by the operation type block and/or the particular sorting type block comprises at least one sorting parameter for configuring the sorting operation performed by the particular sorting type block, said graphical programming interface is further configured to set said at least one operation parameter and/or the at least one sorting parameter, the graphical programming interface is further configured to receive a selection indicating whether or not to display said at least one operation parameter and/or said at least one sorting parameter in said simulated inspection process, and/or in the computer program selectively output by said graphical programming interface, or programmed sample inspection process, and the graphical programming interface is further configured to receive a selection indicating whether or not to activate the at least one sorting parameter in said simulated inspection process and/or in the computer program selectively output by said graphical programming interface, or programmed sample inspection process, so that in response to the at least one sorting parameter being activated, the particular sorting type block, which comprises the at least one sorting parameter, uses the at least one sorting parameter.

* * * * *